US009529718B2

United States Patent
Jafri et al.

(10) Patent No.: US 9,529,718 B2
(45) Date of Patent: Dec. 27, 2016

(54) BATCHING MODIFIED BLOCKS TO THE SAME DRAM PAGE

(71) Applicant: Advanced Micro Devices, Inc., Sunnyvale, CA (US)

(72) Inventors: Syed Ali R. Jafri, Bellevue, WA (US); Yasuko Eckert, Kirkland, WA (US); Srilatha Manne, Portland, OR (US); Mithuna S. Thottethodi, West Lafayette, IN (US); Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 161 days.

(21) Appl. No.: 14/569,175

(22) Filed: Dec. 12, 2014

(65) Prior Publication Data

US 2016/0170887 A1    Jun. 16, 2016

(51) Int. Cl.
*G06F 12/00* (2006.01)
*G06F 13/00* (2006.01)
*G06F 13/28* (2006.01)
*G06F 12/08* (2016.01)
*G06F 12/12* (2016.01)

(52) U.S. Cl.
CPC ....... *G06F 12/0833* (2013.01); *G06F 12/0868* (2013.01); *G06F 12/126* (2013.01); *G06F 12/128* (2013.01); *G06F 12/0871* (2013.01); *G06F 12/0891* (2013.01); *G06F 12/121* (2013.01); *G06F 2212/62* (2013.01); *G06F 2212/69* (2013.01)

(58) Field of Classification Search
CPC .............. G06F 12/0806; G06F 12/0833; G06F 12/0868; G06F 12/0871; G06F 12/0891; G06F 12/121; G06F 12/126; G06F 12/128; G06F 2212/62; G06F 2212/69
USPC ......... 711/103, 118, 133–138, 144, 158–160
See application file for complete search history.

(56) References Cited

U.S. PATENT DOCUMENTS

| 2011/0055458 | A1* | 3/2011 | Kuehne | G06F 12/0246 711/103 |
| 2016/0062651 | A1* | 3/2016 | Hineman | G06F 3/061 711/114 |
| 2016/0154743 | A1* | 6/2016 | Pan | G06F 12/0804 711/135 |

OTHER PUBLICATIONS

Chuang et al., Unbounded Page-Based Transactional Memory, Oct. 21-25, 2006, Association for Computing Machinery (ACM), ASOLOS'06, pp. 349-350.*

(Continued)

*Primary Examiner* — Yaima Rigol
*Assistant Examiner* — Shane Woolwine
(74) *Attorney, Agent, or Firm* — Volpe and Koenig, P.C.

(57) ABSTRACT

To efficiently transfer of data from a cache to a memory, it is desirable that more data corresponding to the same page in the memory be loaded in a line buffer. Writing data to a memory page that is not currently loaded in a row buffer requires closing an old page and opening a new page. Both operations consume energy and clock cycles and potentially delay more critical memory read requests. Hence it is desirable to have more than one write going to the same DRAM page to amortize the cost of opening and closing DRAM pages. A desirable approach is batch write backs to the same DRAM page by retaining modified blocks in the cache until a sufficient number of modified blocks belonging to the same memory page are ready for write backs.

20 Claims, 11 Drawing Sheets

(56) References Cited

OTHER PUBLICATIONS

Wang et al, Improving Writeback Efficiency with DeCoupled Last-Write Prediction, 39th Annual ACM/IEEE International Symposium on Computer Architecture (ISCA-2012), Jun. 2012.

* cited by examiner

| Memory Page Address | Dirty Block Count | Priority Bit |
|---|---|---|
| 0 | 16 | 1 |
| 1 | 15 | 0 |
| 2 | 1 | 0 |
|  |  |  |
| 9 | 16 | 1 |
| 10 | 8 | 0 |

BATCHING MODIFIED BLOCKS TO THE SAME DRAM PAGE

BACKGROUND

Field

The embodiments are generally directed to managing memory of a computing device, and more specifically to cache memory management of a computing device.

Background Art

A computing device generally includes one or more processing units (e.g., a central processing unit (CPU), a graphics processing unit (GPU), a general purpose GPU (GPGPU), an accelerated processing unit (APU), or the like), that access a memory. Memory accesses are also called memory events, and an example includes a write event (i.e., a memory access request to write data to main memory). The processing units may execute programs that result in accessing data in the memory. Some data is accessed more frequently than others. Access time of this data can be improved by using different levels of cache between the processor and the memory.

BRIEF SUMMARY OF EMBODIMENTS

It is desirable to improve access time of frequently accessed data by using a knowledge of the data access frequency, when transferring data between cache and the memory.

Certain embodiments include a method comprising storing data in a block in a cache. The cache may comprise a block set and may be coupled to a buffer. The buffer may be further coupled to a memory that may comprise multiple pages. The method may include evicting a block value from the block set to the buffer based on its priority status and its recentness of use, when there is not enough space to store the data in the block set.

Certain embodiments include a method comprising storing data in a first block in a cache. The cache may comprise a block set and may be coupled to a buffer. The buffer may be further coupled to a memory that may comprise multiple pages. For the memory page, a block count may be calculated to be the count of blocks in the cache that have dirty values corresponding to the page. A priority status may be assigned to each block that has a dirty value with an address corresponding to the page when the page block count exceeds a first threshold. A second block value may be copied to the buffer in response to assigning the priority status to the second block. The block count may be decreased for the page by one, after copying the second block value. The priority status from each block that otherwise has a priority status may be removed when the block count reduces below a second threshold.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Computing devices process data and provide many applications to users. Example computing devices include, but are not limited to, mobile phones, personal computers, workstations, and game consoles. Computing devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications (e.g., graphics) on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In the GPGPU computing, a GPU performs computations that traditionally were handled by a CPU. An accelerated processing unit (APU) includes at least the functions of a CPU and a GPU. The GPU can be a GPGPU.

In an embodiment, a GPU includes one or more compute units (CUs) that process data. A compute unit (CU) includes arithmetic logic units (ALUs) and other resources that process data on the GPU. Data can be processed in parallel within and across compute units.

In an embodiment, a control processor on a GPU schedules task processing on compute units. Tasks include computation instructions. Those computation instructions may access data stored in the memory system of a computing device and manipulate the accessed data. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the electronic device receives power. Examples of non-volatile memory include read-only memory (ROM), flash memory, ferroelectric RAM (F-RAM), hard disks, floppy disks, magnetic tape, optical discs, etc. Non-volatile memory retains its memory state when the electronic device loses power or is turned off.

Figure 1:
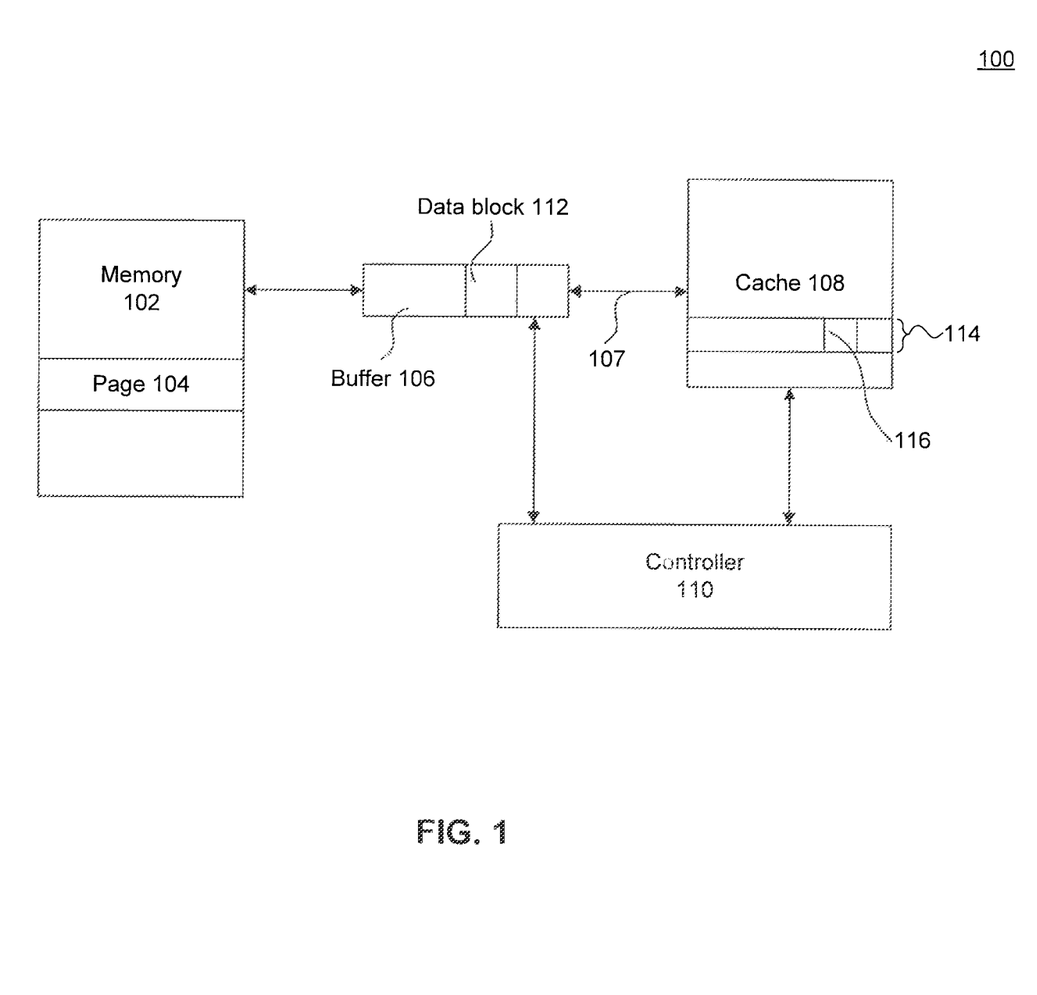
FIG. 1 illustrates a system, according to an embodiment.

FIG. 1 illustrates a system 100, according to an embodiment. In one example, system 100 includes a memory 102, a buffer 106, a cache 108, and a controller 110.

Memory 102 may include a page 104. Page 104 is for example a portion of memory 102. According to an embodiment, memory 102 may include one page or multiple pages. Buffer 106 may include a data block 112. Data block 112 is for example a portion of buffer 106. According to an embodiment, buffer 106 may include one data block or multiple data blocks.

According to an embodiment, memory 102 may be a Dynamic Random Access Memory (DRAM). According to an embodiment, cache 108 may be a Last Level Cache (LLC). According to an embodiment, buffer 106 maybe a DRAM row buffer.

In an embodiment, buffer 106 is connected to memory 102 and cache 108. Buffer 106 may be connected to cache 108 via connection 107. In another embodiment, buffer 106 is not connected to cache 108 via a direct connection. Data may be transferred between buffer 106 and cache 108 via the connection between controller 110 and buffer 106 and the connection between controller 110 and cache 108.

Cache 108 may include a block set or multiple block sets 114, and each block set may include one or more data blocks 116. Buffer 106 may be configured to buffer data from cache 108 for writing to one or more memory pages 104. Buffer 106 may hold one or more data blocks 112.

In one example, it may be desirable to have, at one time, a high number of data blocks 112 in buffer 106 that are written to a same memory page. This is referred to as high locality in buffer 106. High locality may result in lower energy consumption in writing to memory 102 because writing multiple data blocks to a single memory page consumes less energy than writing the multiple data blocks to different memory pages.

Controller 110 is connected to buffer 106 and cache 108 according to an embodiment. Controller 110 may be configured to evict data block 116 from cache 108 to buffer 106. For example, controller 110 may select data block 116, and evict data block 116 by copying a value in data block 116 to buffer 106.

Figure 2:
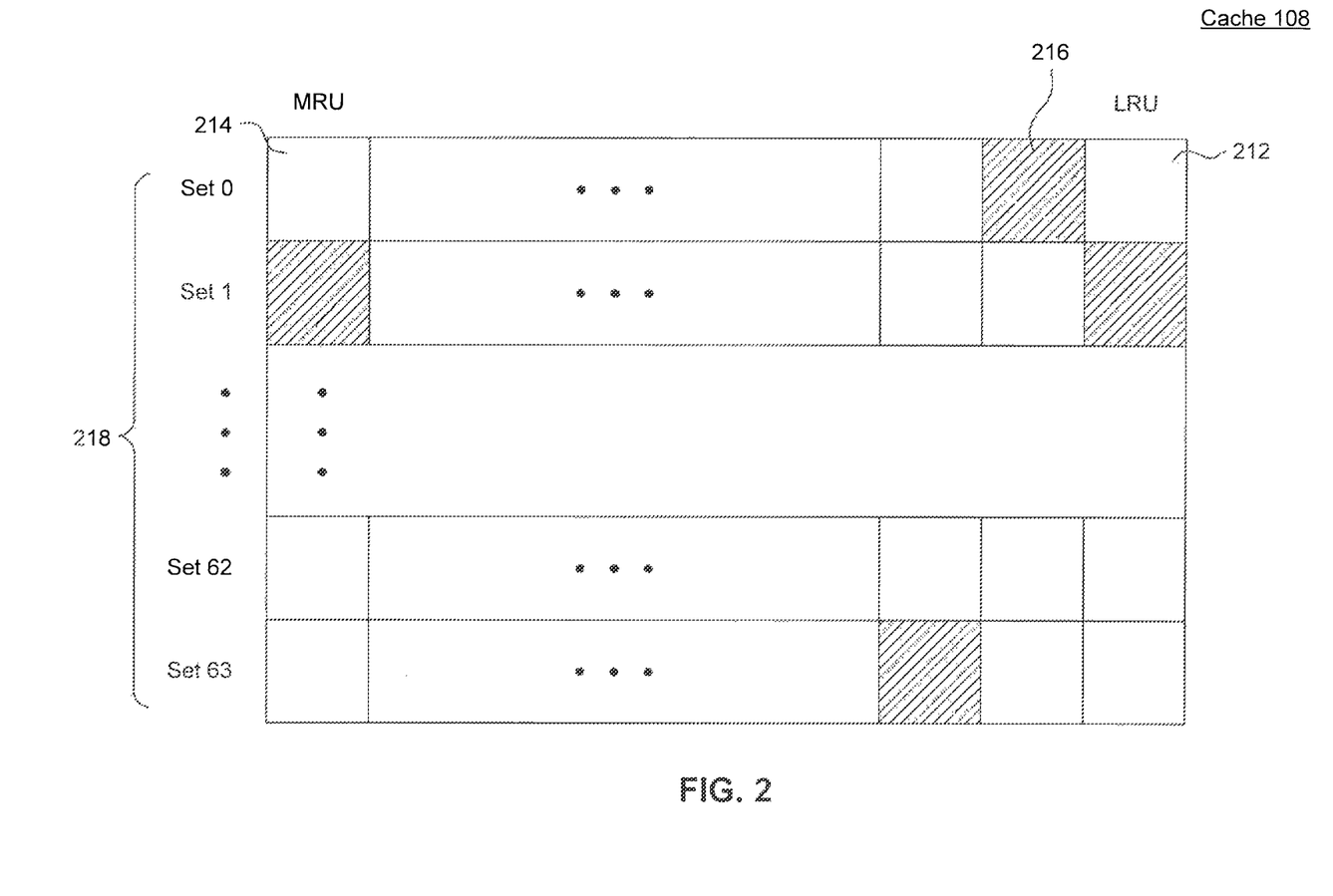
FIG. 2 illustrates cache blocks, according to an embodiment.

FIG. 2 illustrates a cache, e.g., cache 108, according to an embodiment. In this example, cache 108 may include cache blocks 212, 214, and 216. In another example, cache 108 may include block sets 218, for example block set 0, block set 1, . . . , block set 63.

In an embodiment, a block in cache 108 may correspond to a memory page in memory 102, depending on an associativity of cache 108 with memory 102. Associativity of a cache with a memory may show a correspondence between blocks in the cache to memory pages in the memory. In one example, each block in cache 108 may be associated with a corresponding memory page if cache 108 has full associativity with memory 102. In other embodiments, a block in cache 108 may be associated with a corresponding one or more pages in memory 102 depending on associativity of cache 108 with memory 102. In an embodiment, a set of blocks may be associated with a corresponding set of memory pages.

In one example, a block set 114 in cache 108 may include a Least Recently Used Block (LRU) and a Most Recently Used Block (MRU). An LRU may be a block that has new data written to it the longest time ago. An MRU may be a block that has new data written to it the shortest time ago. The blocks may be logically ordered from LRU in the most right hand side to MRU in a most left hand side. For illustration purposes FIG. 2 shows logical ordering of the blocks, according to an embodiment. For example block 212 in block set 0 is the LRU block and block 214 is the MRU block of block set 0. Physical ordering of the blocks in a set may not be in the recency of use order.

Figure 3:
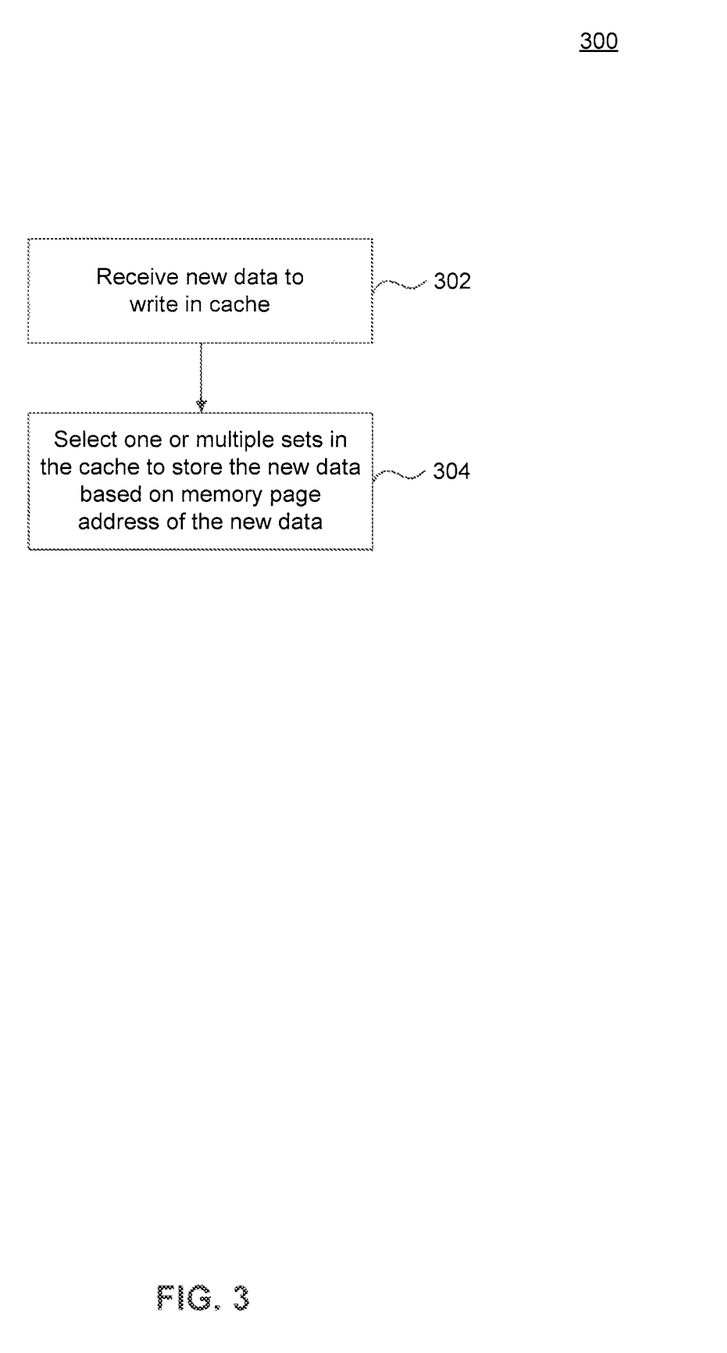
FIGS. 3-9 illustrate flowcharts depicting methods, according to embodiments.

FIG. 3 illustrates a flowchart depicting a method 300, according to an embodiment. In one example, method 300 is used to write data, with a memory page address, to a cache. Solely for illustrative purposes, the steps illustrated in FIG. 3 will be described with reference to example system illustrated in FIG. 1. It is to be appreciated in some instances not all steps need be performed, nor performed in the order shown.

In step 302, cache 108 receives new data. In step 304, controller 110 determines which block set of multiple block sets 218 in cache 108 will be used for storing the data. For example, the block set or multiple block sets are selected based on the memory page address corresponding to the new data.

Figure 4:
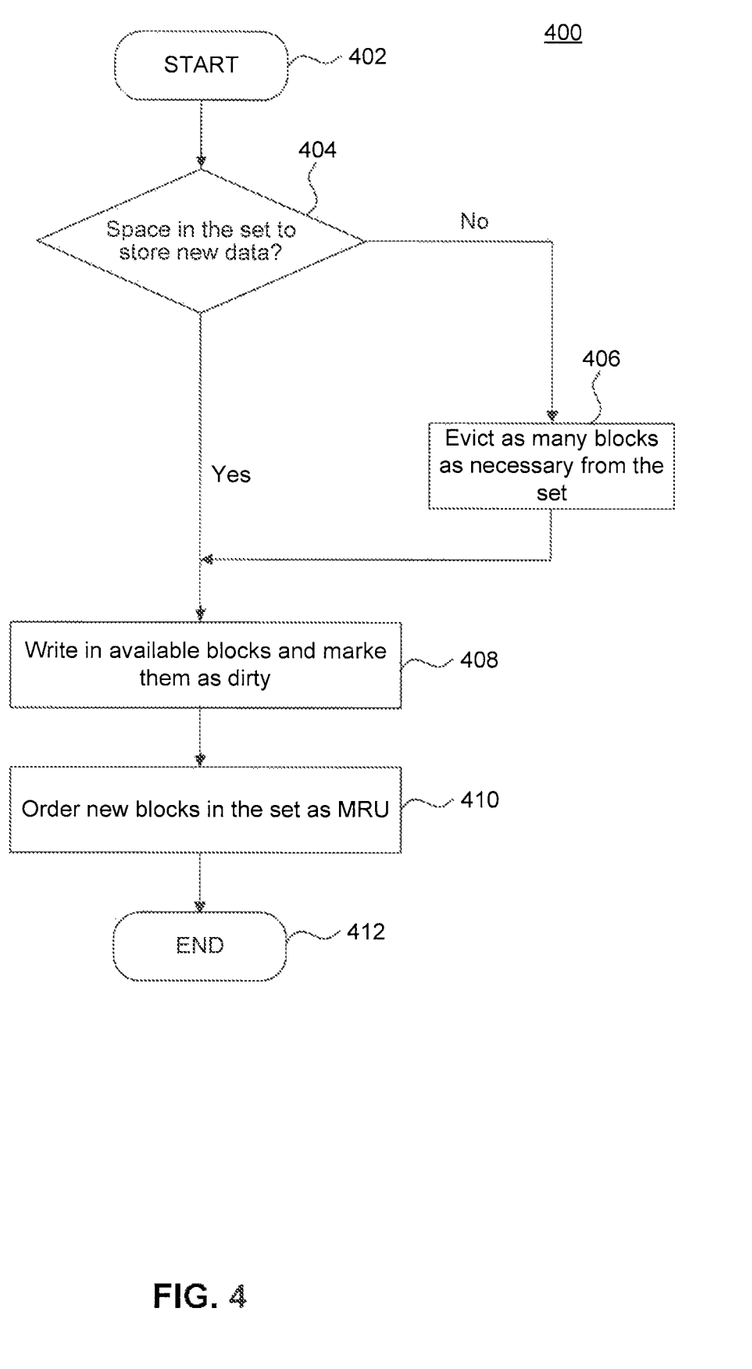

FIG. 4 illustrates a flowchart depicting a method 400, according to an embodiment. In one example, method 400 is used to write data to a cache or to evict data from the cache. Solely for illustrative purposes, the steps illustrated in FIG. 4 will be described with reference to example system illustrated in FIG. 1, cache 108 illustrated in FIG. 2, and method 300 illustrated in FIG. 3. In an embodiment, controller 110 may perform some or all of the steps of method 400. It is to be appreciated in some instances not all steps need be performed, nor performed in the order shown.

According to an embodiment, when there is new data ready to be written to cache 108, at step 404 it is determined whether there is space available in a block set in block sets 218 for storing the new data. The block set for storing the new data may be determined in step 304. If at step 404 it is determined space is available in the block set, at step 408 the new data may be written to one or more available data blocks in the block set and mark the blocks as dirty. For example if data is written to block set 0 in cache 108, the new data may be written to block 216, and block 216 is marked as dirty. In an embodiment, block 216 may remain dirty until the data in block 216 is evicted to buffer 106. Evicting data may be copying or conveying the data to buffer 106, for example. Evicting a data block may refer to evicting the data stored in the block. In an embodiment, if the new data already exists in a data block of cache 108, the new data is overwritten the existing data block without requiring the eviction of another block.

According to an embodiment, if no space is available for writing the new data in the block set determined in step 304, at step 406 at least one block is evicted from the block set. In an embodiment as many data blocks as necessary may be evicted so that there is space for storing the new data. After evicting as many blocks as necessary, the new data may be written in the available blocks and marked as dirty in step 408.

In an embodiment, method 400 at step 410 may order the blocks in the block set such that the blocks that have new value written to them in step 408, are ordered as the most recently used blocks, or in the MRU side of the block set. For example, referring to FIG. 2, if new data value is written to block 216 in block set 0 of cache 108, method 400 at step 410 orders the blocks in block set 0 such that block 216 is the Most Recent Used (MRU) block of block set 0.

Figure 5:
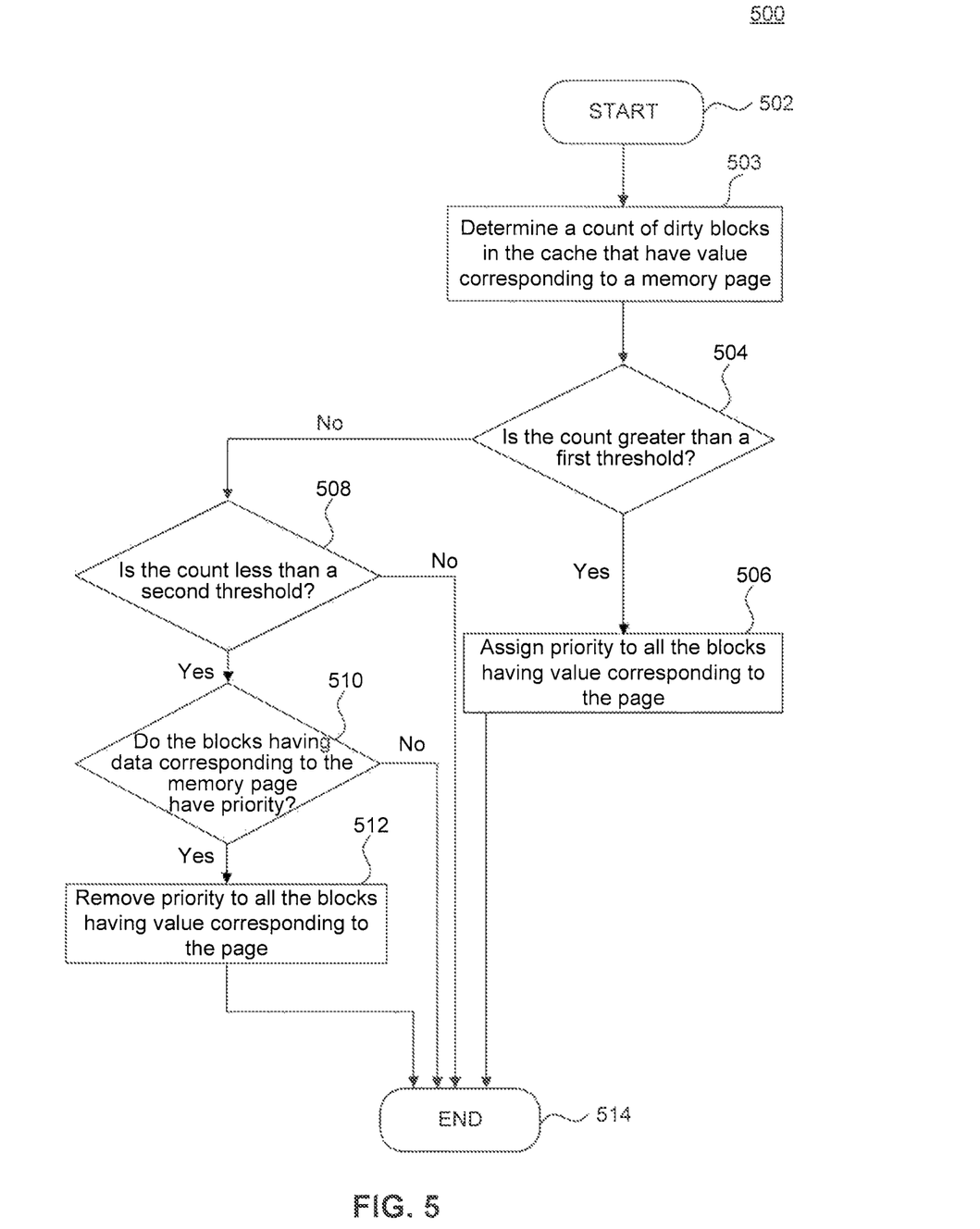

FIG. 5 illustrates a flowchart depicting a method 500, according to an embodiment. In one example, method 500 is used to determine a priority of a block in a cache. Solely for illustrative purposes, the steps illustrated in FIG. 5 will be described with reference to example system illustrated in FIG. 1 and cache 108 illustrated in FIG. 2. In an embodiment, controller 110 may perform some or all of the steps of method 500. It is to be appreciated in some instances not all steps need be performed, nor performed in the order shown.

In an embodiment, method 500 determines priority for each memory page of memory 102. As an example, memory page 104 is used to describe method 500. Method 500 may be used for determining priority with respect to other memory pages in memory 102.

In an embodiment, at step 503 a count of dirty blocks in cache 108 that have value with address corresponding to memory page 104 is determined. At step 504, a determination is made whether the count is greater than a first threshold. If the count is greater than the first threshold, at step 506 priority is assigned to all of the blocks in cache 108 that have value with address corresponding to memory page 104.

In an embodiment, if the count is less than the first threshold, at step 508 a determination is made whether the count is less than a second threshold. If the count is not less than the second threshold, 500 ends at step 514.

In an embodiment, if the count is less than the second threshold, at step 510, a determination is made whether the block or blocks that have data corresponding to memory page 104 are already assigned priority. If the blocks are not assigned priority the method may end at step 514. In an embodiment, if the blocks having data corresponding to memory page 104 are assigned priority, at step 512 priority is removed from all of the blocks having value with address corresponding memory page 104.

In an embodiment, the first and second thresholds are predetermined. In an embodiment, either or both of the first and second thresholds may be dynamically determined for each operation of method 500. In another embodiment, the second threshold may be zero.

Figure 6:
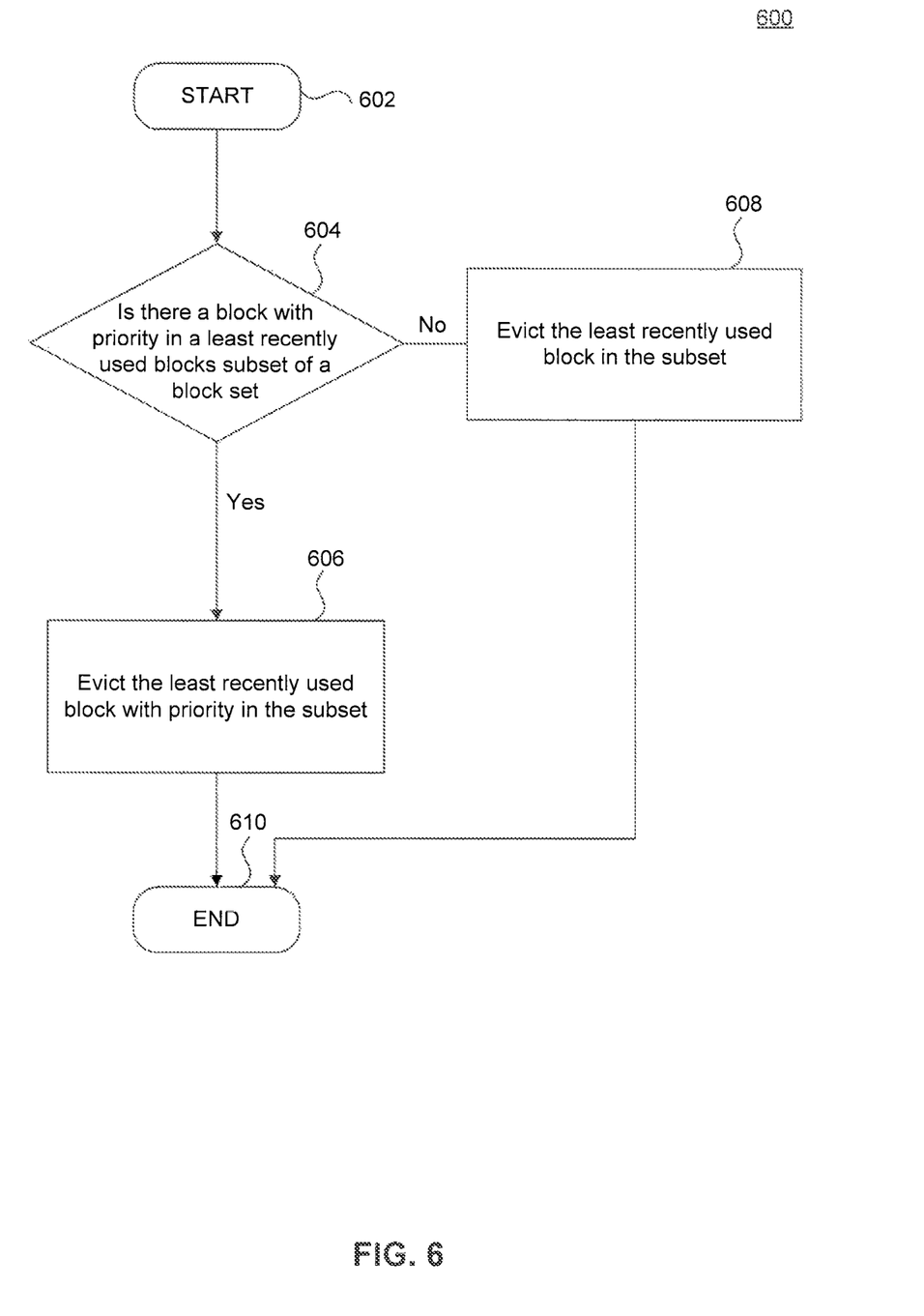

FIG. 6 illustrates a flowchart depicting a method 600, according to an embodiment. In one example, method 600 is used to evict from cache 108 to buffer 106. Solely for illustrative purposes, the steps illustrated in FIG. 6 will be described with reference to example system illustrated in FIG. 1 and cache 108 illustrated in FIG. 2. In an embodiment, controller 110 may perform some or all of the steps of method 600. It is to be appreciated in some instances not all steps need be performed, nor performed in the order shown.

In an embodiment, at step 604 a determination is made whether there is any block with priority status in a least recently used blocks sub-set of a block set in block sets 218. For example the least recently used blocks sub-set may be the N blocks in the block set that were used the longest time ago, wherein N is an integer. In an embodiment, N may be dynamically determined each time method 600 is used. In an embodiment, N is predetermined.

If there is a block with priority in the least recently used blocks sub-set, at step 606 a least recently used block with priority in the block sub-set is evicted. The least recently used block with priority may be a block that has new data written to it the longest time ago and is assigned priority.

If there is no block with priority in the least recently used blocks sub-set, at step 608 the least recently used block in the block sub-set, regardless of priority, may be evicted. The least recently used block may be the block that has new data written to it the longest time ago.

Figure 7:
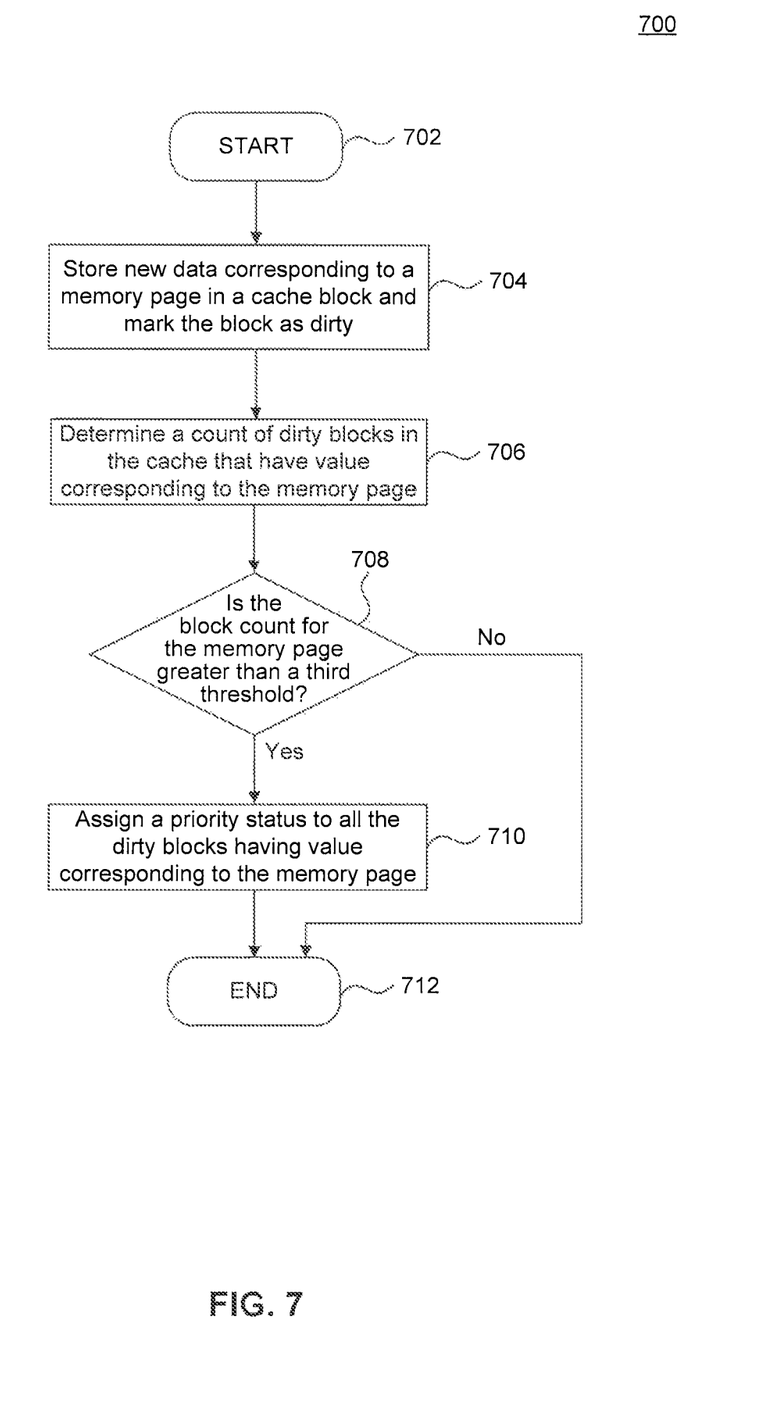

FIG. 7 illustrates a flowchart depicting a method 700, according to an embodiment. In one example, method 700 is used to store data in a cache. Solely for illustrative purposes, the steps illustrated in FIG. 7 will be described with reference to example system illustrated in FIG. 1, and cache 108 illustrated in FIG. 2. In an embodiment, controller 110 may perform some or all of the steps of method 700. It is to be appreciated in some instances not all steps need be performed, nor performed in the order shown.

In an embodiment, at step 704 new data, corresponding to a memory page in memory 102, is stored in a block in cache 108 and the block is marked as dirty. For example new data, corresponding to memory page 104, is written in block 216 in cache 108 and block 216 is marked as dirty. In an embodiment, block 216 may remain dirty until the data in block 216 is evicted to buffer 106, or the data block is otherwise marked as clean.

In an embodiment, at step 706 a count of dirty blocks in cache 108 that have value with address corresponding to the memory page of step 704 is determined. In an embodiment, at step 708 a determination is made whether the block count for the memory page of step 704 is greater than a third threshold. In an embodiment, if the count is greater than the third threshold, at step 710 a priority status is assigned to all the dirty blocks containing value with address corresponding to the memory page of step 704. In an embodiment, if the count is not greater than the third threshold, 700 ends at step 712.

Figure 8:
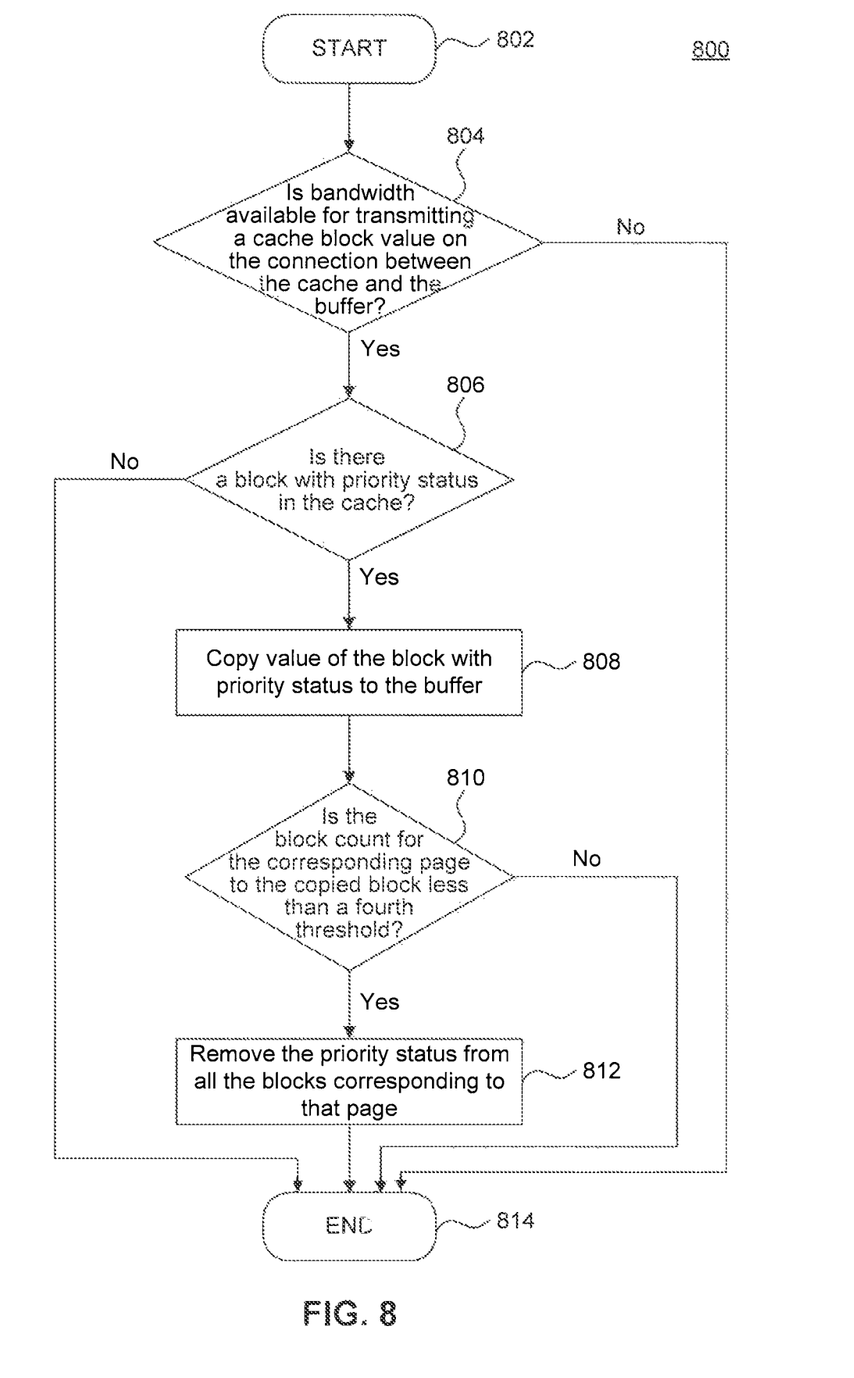

FIG. 8 illustrates a flowchart depicting a method 800, according to an embodiment. In one example, method 800 is used to copy a block value from a cache to a buffer. Solely for illustrative purposes, the steps illustrated in FIG. 8 will be described with reference to example system illustrated in FIG. 1, and example cache 108 illustrated in FIG. 2. In an embodiment, controller 110 may perform some or all of the steps of method 800. It is to be appreciated in some instances not all steps need be performed, nor performed in the order shown.

In embodiments, method 800 copies a block value from cache 108 to buffer 106, such that there will be high locality in the buffer. According to an embodiment, at step 804 a determination is made whether there is bandwidth available on a connection 107 between cache 108 and buffer 106. In example embodiments, transmitting a block value between cache 108 to buffer 102 consumes bandwidth on connection 107. In an embodiment, a block value may be transmitted in addition to current data being transmitted on connection 107, when there is enough bandwidth available for the block value.

In an embodiment, if there is not enough bandwidth available for transmitting a cache block value on connection 107, 800 ends at step 814. In an embodiment, if there is enough bandwidth available for transmitting a block value on connection 107, at step 806 a determination is made whether there is a block with priority status in cache 108. In an embodiment, if at step 806 a determination is made that there is no block with priority status in cache 108, 800 ends at step 814.

In embodiments, buffer 106 is not connected to cache 108 via a direct connection 107, as described with respect to FIG. 1. Steps of method 800 that use connection 107 may be performed using the connection between controller 110 and buffer 106 and the connection between controller 110 and cache 108.

In an embodiment, if there is a block with priority status in cache 108, at step 808 value of a block with priority status is transmitted to the buffer 106. In an embodiment at step 808 value of a least recently used block with priority status is transmitted to buffer 106. In an embodiment, at step 808 value of a block with priority status within a first number of least recently used blocks, is transmitted to buffer 106. In an embodiment, a block is within a first number of least recently used blocks, when the block is among the first number of blocks that have data written to them the longest time ago.

In an embodiment the first number is predetermined. In another embodiment the first number is dynamically determined before executing method 800.

In an embodiment at step 810 a determination is made whether the block count for the corresponding memory page to the copied block is less than a fourth threshold. In an embodiment, if the block count is not less than the fourth threshold, 800 ends at step 814. In an embodiment, if the block count is less than the fourth threshold, at step 812 the priority status from all the blocks corresponding to the memory page of step 810 is removed.

In an embodiment, the third and fourth thresholds are predetermined. In another embodiment, the third and fourth threshold may be dynamically determined for each operation of method 800. In an embodiment, the fourth threshold may be zero.

Figure 9:
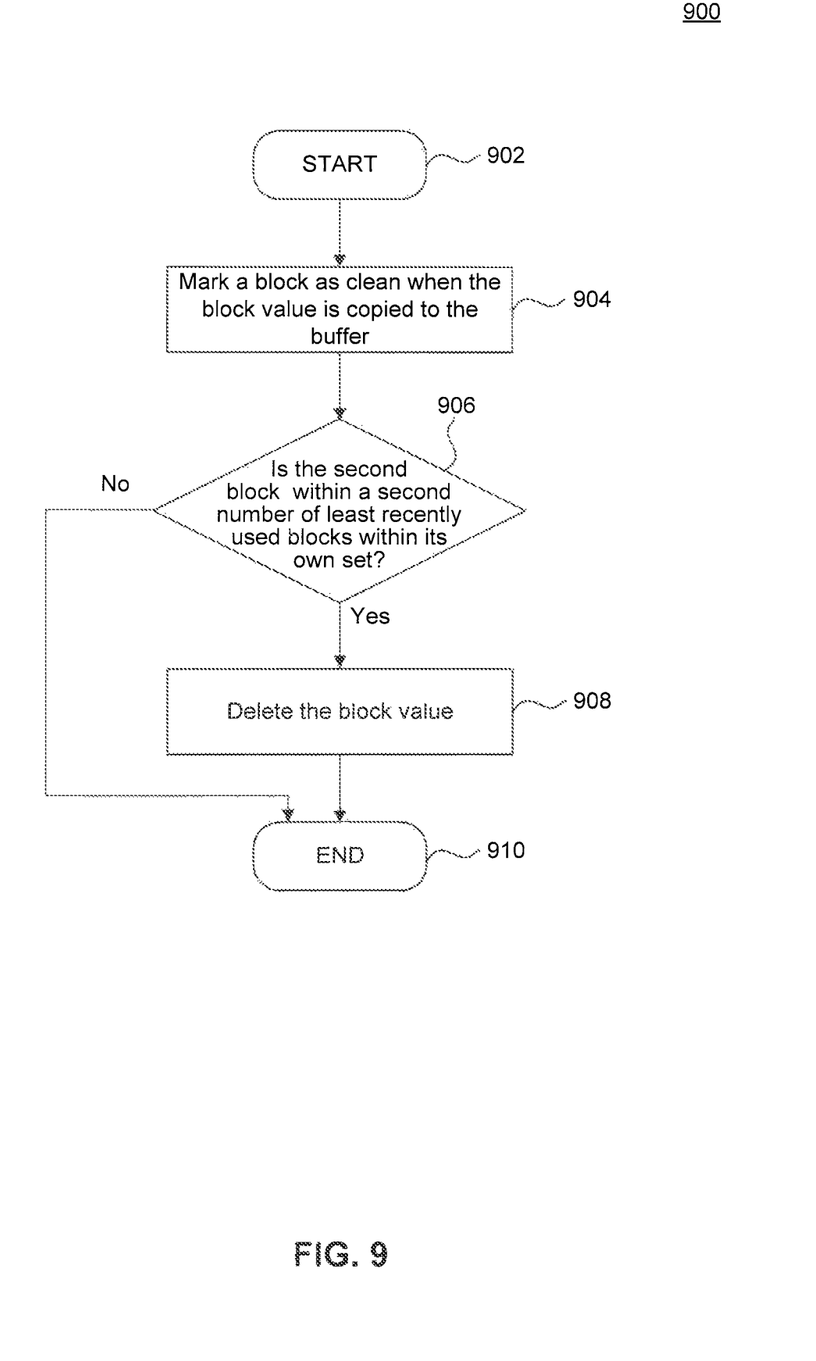

FIG. 9 illustrates a flowchart depicting a method 900, according to an embodiment. In one example, method 900 is used to delete or clean a block in a cache. Solely for illustrative purposes, the steps illustrated in FIG. 9 will be described with reference to example system illustrated in FIG. 1. In an embodiment, controller 110 may perform some or all of the steps of method 900. It is to be appreciated in some instances not all steps need be performed, nor performed in the order shown.

In an embodiment, at step 904, when a block value is copied to buffer 106, the block is marked as clean. In embodiments, when a block is marked as clean it is not dirty any more.

In an embodiment, at step 906 a determination is made whether the cleaned block at step 904 is within a second number of least recently used blocks within a block set that includes the cleaned block. In an embodiment, if the block is not within the second number of least recently used blocks, 900 ends at step 910.

In an embodiment, if the cleaned block is within the second number of least recently used blocks, at step 908 the cleaned block value is deleted and the block becomes available for storing new value.

In an embodiment the second number is predetermined. In another embodiment, the second number is dynamically determined before executing method 900. In an embodiment, the second number is zero.

Embodiments may use approximations of least recently used blocks, such as "Pseudo Least Recently Used" (pLRU) instead of least recently used blocks described above.

Figure 10:
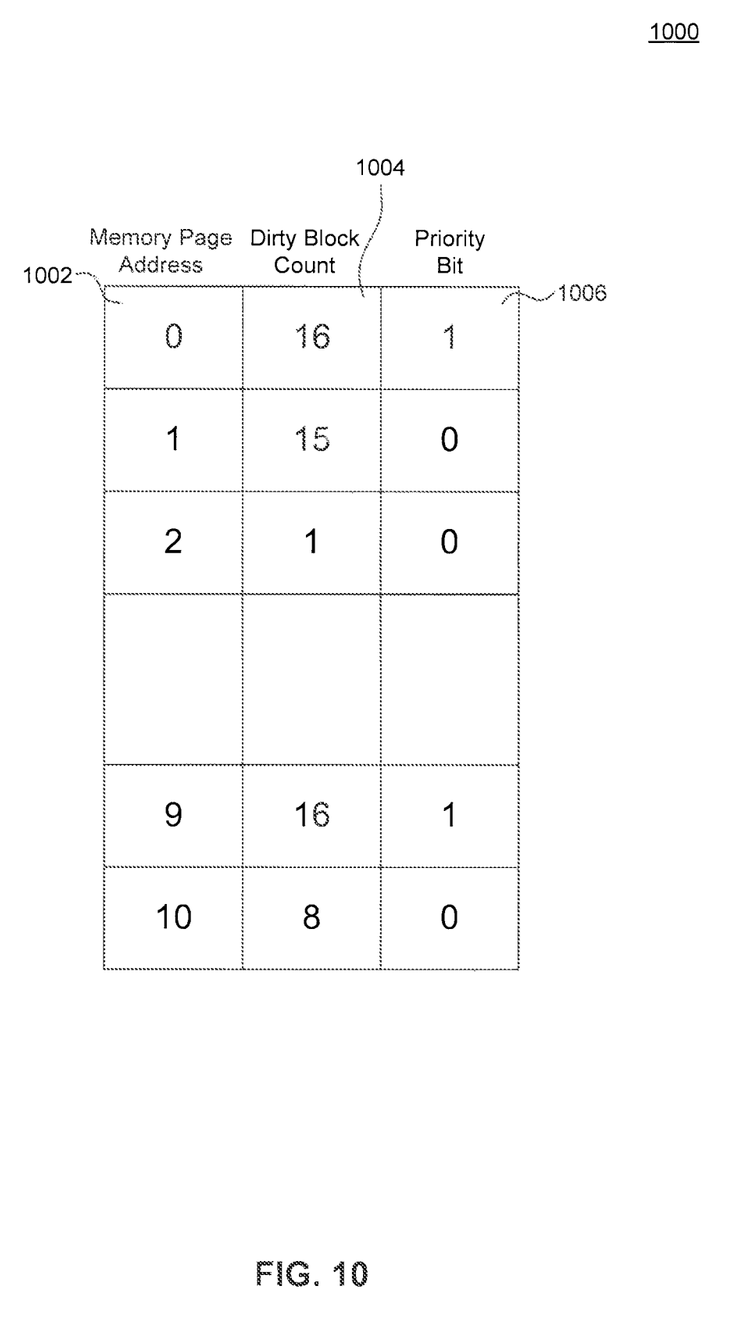
FIG. 10 illustrates an example of a table of priority information of cache blocks, according to an embodiment.

FIG. 10 illustrates a table according to an embodiment. In this example, table 1000 is used to store priority information for all cache blocks having value with address corresponding to each memory page. Solely for illustrative purposes, table 1000 will be described with reference to example system illustrated in FIG. 1.

According to an embodiment, table 1000 may include a row corresponding to each memory page in memory 100. In an embodiment table 1000 includes a memory page address column, a dirty block count column, and a priority bit column. According to an embodiment, a first column in a row includes an address of a memory page, a second column in the row includes a count of all dirty blocks having value with address corresponding to the memory page, and a third column in the row includes a priority bit. According to an embodiment, when methods 500, 700, or 800 determine priority for all the blocks having dirty value with address corresponding to a memory page, the priority bit of a row corresponding to the memory page in table 1000 is set to "1" to show priority.

For example, in table 1000 page address 1002 indicates memory page address 0. Dirty block count 1004 indicates that there are 16 dirty blocks having value with address corresponding to memory page address 0. And "1" in priority bit 1006 indicates that method 500, 700, or 800 has determined that all the blocks having value with address corresponding to memory page address 0 have priority.

Figure 11:
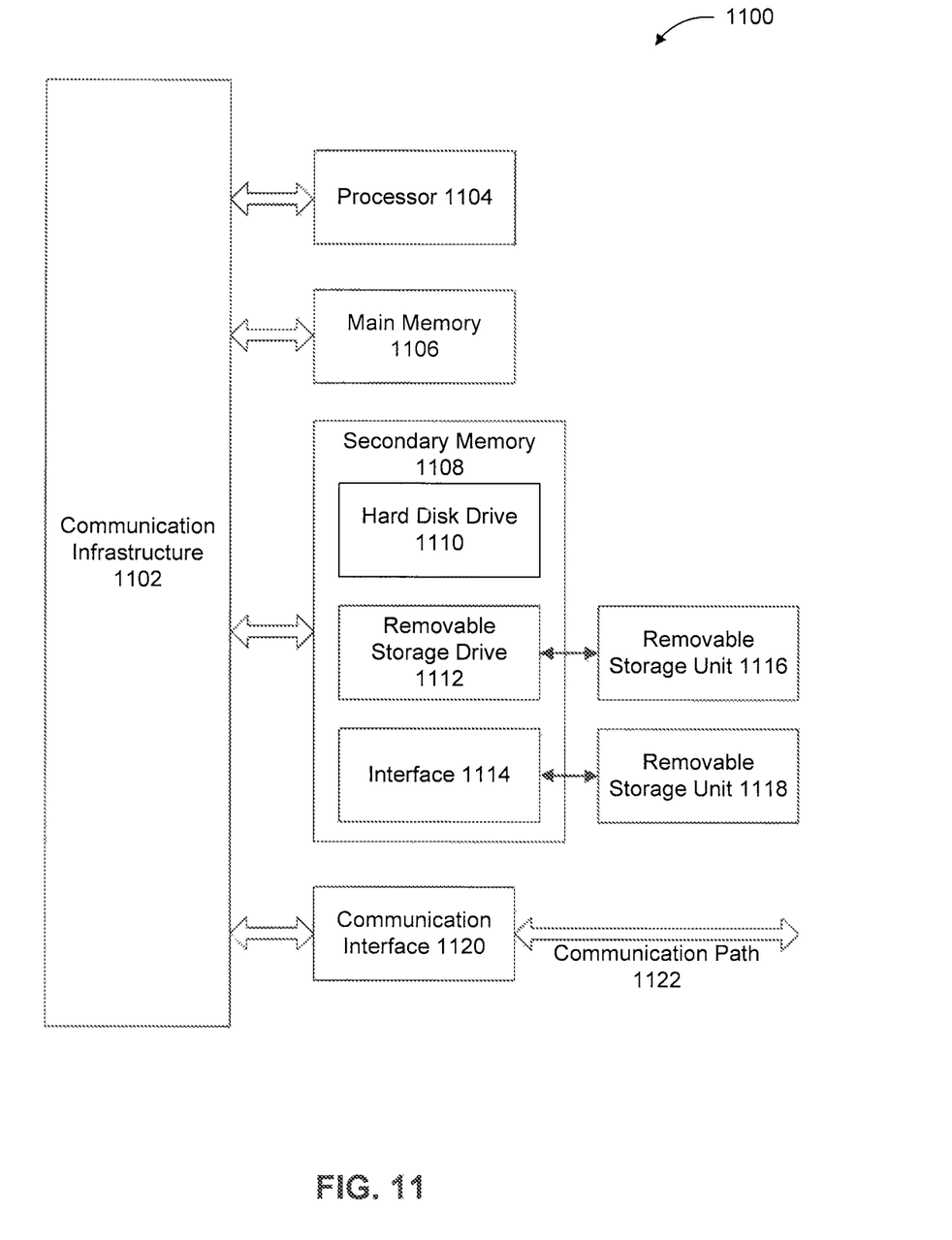
FIG. 11 illustrates an example computer system in which embodiments may be implemented.

Various aspects of the disclosure can be implemented by software, firmware, hardware, or a combination thereof. FIG. 11 illustrates an example computer system 1100 in which some embodiments, or portions thereof, can be implemented as computer-readable code. For example, the methods 300-900, of FIGS. 3 through 9 can be implemented in system 1100. Various embodiments are described in terms of the example computer system 1100. After reading this description, it will become apparent to a person skilled in the relevant art how to implement the embodiments using other computer systems and/or computer architectures.

Computer system 1100 includes one or more processors, such as processor 1104. Processor 1104 can be a special purpose or a general purpose processor.

Computer system 1100 also includes a main memory 1108, such as random access memory (RAM) such as memory 102 of FIG. 1, and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. that is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 that allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals that may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the embodiments as discussed herein. In particular, the computer programs, when executed, enable processor 1104 to implement the disclosed processes, such as the steps in the method 300 of FIG. 3, method 400 of FIG. 4, method 500 of FIG. 5, method 600 of FIG. 6, method 700 of FIG. 7, method 800 of FIG. 8, or method 900 of FIG. 9, as discussed above. Accordingly, such computer programs represent controllers of the computer system 1100. Where the embodiments are implemented using software, the software may be stored in a computer program product and loaded into computer system 1100 using removable storage drive 1114, interface 1120, hard drive 1112 or communications interface 1127. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method, comprising:
   storing a value in a first block in a cache, wherein the cache comprises a block set and is coupled to a buffer, and the buffer is further coupled to a memory that comprises multiple pages;
   corresponding the first block value to a page in the memory;
   calculating, for the page, a block count to be the count of blocks in the cache that have dirty values corresponding to the page;
   assigning a priority status to each block that has a dirty value with an address corresponding to the page when the block count exceeds a first threshold;
   copying a second block value to the buffer in response to assigning the priority status to the second block;
   decreasing the block count for the page by one, after copying the second block value; and
   removing the priority status from each block that otherwise has a priority status when the block count reduces below a second threshold.

2. The method of claim 1, further comprising choosing the second block to be within a first number of least recent used blocks with priority.

3. The method of claim 2, further comprising choosing the first block as the second block.

4. The method of claim 3, wherein the cache comprises multiple block sets, the method further comprising: choosing, for each block set, a candidate block with priority status for copying to the buffer.

5. The method of claim 1, further comprising: indicating the second block value as clean after copying the second block value to the buffer.

6. The method of claim 1, further comprising: deleting the second block value after copying the block value from the cache to the buffer.

7. The method of claim 6, further comprising: deleting the second block value after copying the block value from the cache to the buffer, when the second block is within a second number of least recently used blocks in the block set.

8. The method of claim 1, wherein the copying occurs when a connection bandwidth between the cache and the buffer is available.

9. An apparatus, comprising:
   a memory comprising multiple pages;
   a cache comprising a block set;
   a buffer operatively coupled to the memory and the cache; and
   a controller operatively coupled to the cache, the controller configured to:
      store a value in a first block in the cache;
      correspond the first block value to a page in the memory;
      calculate, for the page, a block count to be the count of blocks in the cache that have dirty values corresponding to the page;
      assign a priority status to each block that has a dirty value with an address corresponding to the page when the block count exceeds a first threshold;
      copy a second block value to the buffer in response to assigning the priority status to the second block;
      decrease the block count for the page by one, after copying the second block value; and
      remove the priority status from each block that otherwise has a priority status when the block count reduces below a second threshold.

10. The apparatus of claim 9 wherein the controller is further configured to choose the second block to be within a first number of least recent used blocks with priority.

11. The method of claim 10 wherein the controller is further configured to choose the first block as the second block.

12. The method of claim 11 wherein the cache comprises multiple block sets, and wherein the controller is further configured to choose for each block set, a candidate block with priority status for copying to the buffer.

13. The method of claim 9 wherein the controller is further configured to indicate the second block value as clean after copying the second block value to the buffer.

14. The method of claim 9 wherein the controller is further configured to delete the second block value after copying the block value from the cache to the buffer.

15. The method of claim 14 wherein the controller is further configured to delete the second block value after copying the block value from the cache to the buffer, when the second block is within a second number of least recently used blocks in the block set.

16. The method of claim 9 wherein the controller is further configured to copy when a connection bandwidth between the cache and the buffer is available.

17. A non-transitory computer-readable medium, having instructions recorded thereon that, when executed by a computing device, cause the computing device to perform operations comprising:
   storing a value in a first block in a cache, wherein the cache comprises a block set and is coupled to a buffer, and the buffer is further coupled to a memory that comprises multiple pages;
   corresponding the first block value to a page in the memory;
   calculating, for the page, a block count to be the count of blocks in the cache that have dirty values corresponding to the page;
   assigning a priority status to each block that has a dirty value with an address corresponding to the page when the block count exceeds a first threshold;
   copying a second block value to the buffer in response to assigning the priority status to the second block;
   decreasing the block count for the page by one, after copying the second block value; and
   removing the priority status from each block that otherwise has a priority status when the block count reduces below a second threshold.

18. The non-transitory computer-readable medium of claim 17, further comprising choosing the second block to be within a first number of least recent used blocks with priority.

19. The non-transitory computer-readable medium of claim 18, further comprising choosing the first block as the second block.

20. The non-transitory computer-readable medium of claim 19, wherein the cache comprises multiple block sets, the method further comprising: choosing, for each block set, a candidate block with priority status for copying to the buffer.

* * * * *